(12) United States Patent  (10) Patent No.: US 8,803,965 B2
Yamamoto  (45) Date of Patent: Aug. 12, 2014

(54) ARITHMETICALLY OPERATING DEVICE, ARITHMETICALLY OPERATING METHOD, ARITHMETICALLY OPERATING PROGRAM, AND MICROSCOPE

(75) Inventor: Takashi Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 12/972,048

(22) Filed: Dec. 17, 2010

(65) Prior Publication Data

US 2011/0157350 A1 Jun. 30, 2011

(30) Foreign Application Priority Data

Dec. 25, 2009 (JP) ................. P2009-295381

(51) Int. Cl.
*H05K 1/16* (2006.01)
*H04N 7/18* (2006.01)
*G02B 21/14* (2006.01)

(52) U.S. Cl.
CPC .................... *G02B 21/14* (2013.01)
USPC .................... 348/79; 348/E7.085

(58) Field of Classification Search
CPC ....................................... G06K 9/00
USPC .......................................... 348/79
See application file for complete search history.

(56) References Cited

U.S. PATENT DOCUMENTS

| 2004/0070822 A1* | 4/2004 | Shioda et al. ............. 359/372 |
| 2008/0002878 A1* | 1/2008 | Meiyappan ............... 382/154 |
| 2008/0055412 A1* | 3/2008 | Tanaka .................... 348/159 |

FOREIGN PATENT DOCUMENTS

| JP | 07-181010 | 7/1995 |
| JP | 2004-219987 | 8/2004 |
| JP | 2009-175334 | 8/2009 |

OTHER PUBLICATIONS

Japanese Office Action issued Nov. 5, 2013 in corresponding Japanese Patent Application No. 2009-295381.

* cited by examiner

*Primary Examiner* — Richard Torrente
*Assistant Examiner* — Frank Huang
(74) *Attorney, Agent, or Firm* — K&L Gates LLP

(57) ABSTRACT

An arithmetically operating device is provided and includes: an image acquiring portion configured to acquire phase difference images of a sample; a retrieval range setting portion configured to set a range of pixels each to be made a retrieval object in the other image in the phase difference images for pixels each to be made a representative set in one image in the phase difference images, and pixels other than the pixels each to be made the representative; a correlation calculating portion configured to calculate correlations between the pixels for the one image, and the pixels in the range set for the pixels; and a parallax calculating portion configured to calculate parallaxes for the pixels for the one image in accordance with the correlations thus calculated.

9 Claims, 7 Drawing Sheets

ARITHMETICALLY OPERATING DEVICE, ARITHMETICALLY OPERATING METHOD, ARITHMETICALLY OPERATING PROGRAM, AND MICROSCOPE

CROSS REFERENCES TO RELATED APPLICATIONS

The present application claims priority to Japanese Patent Application JP 2009-295381 filed on Dec. 25, 2009, the entire contents of which are hereby incorporated by reference.

BACKGROUND

The present disclosure relates to an automatically operating device, an automatically operating method, an automatically operating program, and a microscope, and more particularly to an automatically operating device, an automatically operating method, an automatically operating program, and a microscope which, for example, are suitable for being applied to a field in which a biological body sample is enlarged to be observed.

In a pathological diagnosis, a biological body sample such as a tissue slice is fixed to a slide glass, and is then made in the form of a preparation through a staining process, and an enclosure process. In general, when a storage period of time for the preparation becomes long, the visibility in a microscope for the preparation becomes worse due to deterioration, color fading and the like of the biological body sample. In addition, the preparation is subjected to microscopical visualization in a facility other than a facility such as a hospital in which the preparation was made in some cases. However, delivery and receipt of the preparation are generally carried out by mailing, and thus it takes given time to carry out the mailing for the delivery and the receipt of the preparation.

In the light of such an actual condition, a device for preserving a biological body sample as image data has been prepared. This device, for example, is described in Japanese Patent Laid-Open No. 2009-175334.

SUMMARY

When the biological body sample is acquired as the image data, for the purpose of focusing an optical lens on the biological body sample, it is necessary to grasp a position of the biological body sample in an optical axis direction of the optical lens.

Heretofore, a focal point of the optical lens is shifted in the optical axis direction of the optical lens every predetermined interval, and the positions on the biological body sample are detected in accordance with contrast of captured images in these focal points. For example, when a range of retrieval to the optical axis direction of the optical lens is 100 μm, and a subject depth of the optical lens for focusing a light on the biological body sample is 1 μm, the positions of the biological body sample are detected from about 100 sheets of captured images.

In this case, it takes a lot of time until the positions on the biological body sample are detected, and thus an efficiency of acquiring the biological body sample as the image data is remarkably reduced.

On the other hand, a method of using a stereo camera is known as a method of detecting positions on an object. In the case of the general stereo camera, subject images are acquired by using respective two cameras, and correlations between pixels for one image becoming a reference and pixels for a predetermined retrieval range in the other image are obtained. Also, positions on a subject are calculated in accordance with a shift amount (parallax) with the pixel having the highest correlation.

Here, with the stereo camera, for the purpose of detecting the positions of the objects discontinuously disposed, the ranges of the retrieval of comparative images with respect to the pixels for one image becoming the reference are all set as being identical to one another.

Therefore, it is also expected to detect the positions on the biological body sample by using this method. However, even when this method is used, it takes a lot of time to obtain the correlations, which results in that the efficiency of acquiring the biological body sample as the image data is remarkably reduced.

The present invention has been made in order to solve the problems described above, and it is therefore desirable to provide a thickness arithmetically operating device, a thickness arithmetically operating method, a thickness arithmetically operating program, and a microscope each of which is capable of enhancing an efficiency of acquiring an image of a subject.

In order to attain the desire described above, according to an embodiment, there is provided an arithmetically operating device including: an image acquiring portion configured to acquire phase difference images of a sample; a retrieval range setting portion configured to set a range of pixels each to be made a retrieval object in the other image in the phase difference images for pixels each to be made a representative set in one image in the phase difference images, and pixels other than the pixels each to be made the representative; a correlation calculating portion configured to calculate correlations between the pixels for the one image, and the pixels in the range set for the pixels; and a parallax calculating portion configured to calculate parallaxes for the pixels for the one image in accordance with the correlations thus calculated; in which the retrieval range setting portion sets a range narrower than that set for the pixels each to be made the representative for the pixels other than the pixels each to be made the representative in accordance with the parallaxes calculated for the pixels each to be made the representative.

According to another embodiment, there is provided an arithmetically operating method including the steps of: acquiring phase difference images of a sample; setting a range of pixels each to be made a retrieval object in the other image in the phase difference images for pixels each to be made a representative set in one image in the phase difference images, and pixels other than the pixels each to be made the representative; calculating correlations between the pixels for the one image, and the pixels in the range set for the pixels; and calculating parallaxes for the pixels for the one image in accordance with the correlations thus calculated. In the retrieval range setting step, a range narrower than that set for the pixels each to be made the representative for the pixels other than the pixels each to be made the representative is set in accordance with the parallaxes calculated for the pixels each to be made the representative.

According to another embodiment, there is provided an arithmetically operating program for causing a computer to execute the steps of: acquiring phase difference images of a sample; setting a range of pixels each to be made a retrieval object in the other image in the phase difference images for pixels each to be made a representative set in one image in the phase difference images, and pixels other than the pixels each to be made the representative; calculating correlations between the pixels for the one image, and the pixels in the range set for the pixels; and calculating parallaxes for the pixels for the one image in accordance with the correlations thus calculated. In the retrieval range setting step, a range narrower than that set for the pixels each to be made the representative for the pixels other than the pixels each to be made the representative is set in accordance with the parallaxes calculated for the pixels each to be made the representative.

According to another embodiment, there is provided a microscope including: a mirror for causing an incident light from an objective lens either to travel in a straight line or to be reflected; a first image pickup element for capturing a subject image imaged on the objective lens and projected on one of a direct course side or a reflection side of the mirror; openings provided at a back of the other of the direct course side or the reflection side of the mirror with one pair as a unit, and each having a size becoming a subject depth wider than that of the objective lens; separator lenses provided at respective backs of the openings, for forming phase difference images on a surface on which a subject image is intended to be imaged, the subject image being projected on the other of the direct course side or the reflection side of the mirror; a second image pickup element provided with the surface on which the subject image is intended to be imaged as an image capturing surface; an image acquiring portion configured to acquire phase difference images of a sample from the second image pickup element; a retrieval range setting portion configured to set a range of pixels each to be made a retrieval object in the other image in the phase difference images for pixels each to be made a representative set in one image in the phase difference images, and pixels other than the pixels each to be made the representative; a correlation calculating portion configured to calculate correlations between the pixels for the one image, and the pixels in the range set for the pixels; and a parallax calculating portion configured to calculate parallaxes for the pixels for the one image in accordance with the correlations thus calculated; in which the retrieval range setting portion sets a range narrower than that set for the pixels each to be made the representative for the pixels other than the pixels each to be made the representative in accordance with the parallaxes calculated for the pixels each to be made the representative.

As a result, the correlations for the pixels each to be made the representative is widely retrieved, thereby obtaining the parallaxes, and the correlations for the pixels other than the pixels each to be made the representative is narrowly retrieved in accordance with those parallaxes thus obtained, thereby obtaining the parallaxes. Therefore, the number of times of arithmetic operations can be greatly reduced.

As set forth hereinabove, according to the embodiments, the correlations for the pixels each to be made the representative is widely retrieved, thereby obtaining the parallaxes, and the correlations for the pixels other than the pixels each to be made the representative is narrowly retrieved in accordance with those parallaxes thus obtained, thereby obtaining the parallaxes. Therefore, the number of times of arithmetic operations can be greatly reduced. Thus, it is possible to enhance the efficiency of acquiring the subject image.

Additional features and advantages are described herein, and will be apparent from the following Detailed Description and the figures.

DETAILED DESCRIPTION

Embodiments will be described in detail hereinafter with reference to the accompanying drawings. It is noted that a description will be given below in accordance with the following order.

1. Embodiment
2. Changes

1. Embodiment 1-1. Construction and Configuration of Microscope

Figure 1:
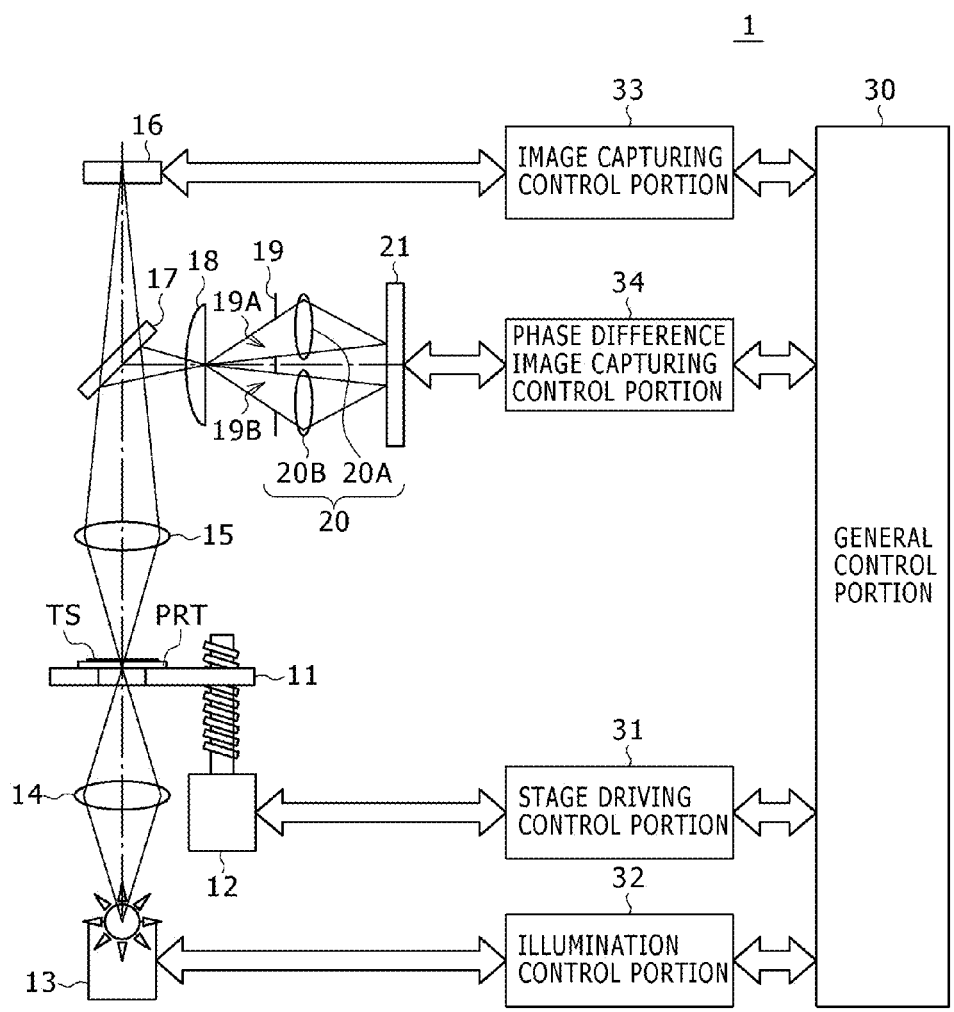
FIG. 1 is a schematic diagram showing a construction and a configuration of a microscope according to an embodiment.

FIG. 1 shows a microscope 1 according to an embodiment. The microscope 1 has a plate-like stage 11 on which a preparation PRT is placed.

The preparation PRT is obtained by fixing and enclosing a tissue slice TS such as a connective tissue such as a blood or an epithelial tissue, or both these tissues to a slide glass by utilizing a predetermined fixed technique. Also, the tissue slice TS is subjected to staining as may be necessary. Not only the staining called the general staining typified by hematoxylin-eosin (HE) staining, Giemsa staining or Papanicolaou staining, but also the staining called the special staining such as Fluorescence In-Situ Hybridization (FISH) or an enzyme antibody technique are contained in this straining.

The plate-like stage 11 is provided with a stage driving mechanism 12. The stage driving mechanism 12 is adapted to drive the stage 11 both in a direction (in an X-axis-Y-axis direction) parallel with a stage surface, and in a direction (in a Z-axis direction) orthogonal to the stage surface. By the way, a restraining portion (not shown) for restraining the preparation PRT at a fixed position is generally provided in a stage surface (hereinafter referred to as "a preparation placement surface" as well) on a side on which the preparation RPT is placed.

A light source 13 is disposed on a surface side opposite to the preparation placement surface of the stage 11. The light source 13 is adapted to carry out illumination by switching a light for illuminating the tissue slice TS subjected to the general staining (hereinafter referred to as "a light field illumination light" as well), and a light for illuminating the tissue slice TS subjected to the special staining (hereinafter referred to as "a dark field illumination light" as well) over to each other. However, a light source with which one of the light field illumination light or the dark field illumination light can be illuminated may also be used as the light source 13. A condenser lens 14 having a normal line to a reference position on the preparation placement surface as an optical axis is disposed between the light source 13 and the stage 11.

An objective lens 15 having a predetermined magnification and having the normal line to the reference position on the stage surface as the optical axis is disposed on the preparation placement surface of the stage 11. An image pickup element 16 having a surface becoming a main imaging surface of the objective lens 15 as an imaging area is disposed at the back of the objective lens 15.

In addition, in the microscope 1, a half mirror 17 is provided between the objective lens 15 and the image pickup element 16 on the normal line to the reference position on the preparation placement surface. The half mirror 17 divides a light made incident thereto from the objective lens 15 into a transmitted light and a reflected light.

A field lens 18 relays a subject image projected from the objective lens 15, for example, to the side opposite to the half mirror 17 to the back (an imaging surface intended). Since the subject light reflected by the half mirror 17 is collected in the field lens 18, the reduction in lightness in the circumference of the field of view is suppressed.

A stop mask 19 is disposed at the back of the field lens 18. Also, the stop mask 19 has a pair of openings 19A and 19B in respective positions which are symmetrical with respect to an optical axis, as a boundary, on a surface orthogonal to the optical axis of the field lens 18. A size of each of these openings 19A and 19B is adjusted in such a way that a subject depth of each of separator lenses 20A and 20B is wider than that of the objective lens 15.

The stop mask 19 divides the subject luminous flux made incident thereto from the field lens 18 by these openings 19A and 19B. The luminous fluxes obtained through the division intersect with each other on the imaging surface of the subject luminous flux to become luminous fluxes which are exchanged in positional relationship from each other in the vicinity of the imaging surface.

The separator lenses 20A and 20B are individually disposed at the back of the paired openings 19A and 19B, respectively. The separator lenses 20A and 20B images with tilt (shifts) the division luminous fluxes obtained through the division by the corresponding openings 19A and 19B, and forms a set of subject images (hereinafter referred to as "phase difference images" as well) on the intended imaging surface relayed by the field lens 18.

It is noted that when the separator lenses 20A and 20B are subjected to vignetting, a part of the division luminous fluxes suffers a loss. For this reason, the separator lenses 20A and 20B are disposed against a center side of the field lens 18 to prevent vignetting.

The image pickup element 21 is not constructed in the form of a line sensor, but is constructed in the form of an area sensor in which the intended imaging surface of the subject image relayed by the field lens 18 is used as the imaging area.

Figure 2:
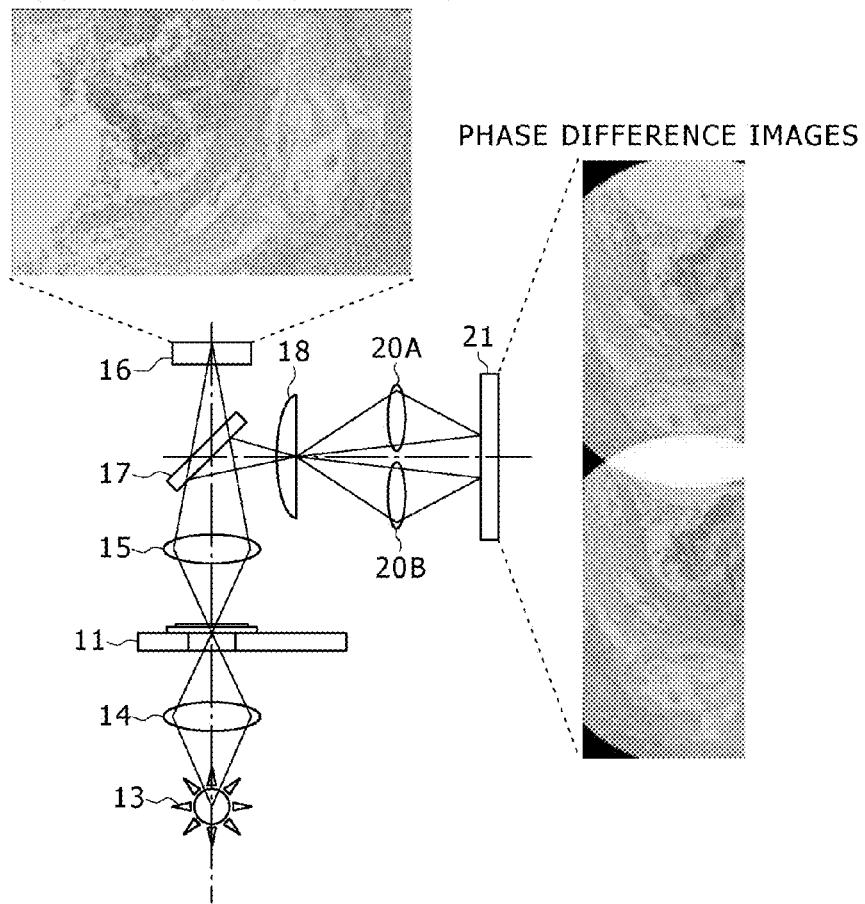
FIG. 2 is a photograph showing an image of a photographing object and phase difference images of a tissue slice.

FIG. 2 shows a photograph of a light field image (photographing objective image) captured by using the image pickup element 16 disposed on the main imaging surface of the objective lens 15, and a photograph of phase difference images captured by using the image pickup element 21 disposed on the intended imaging surface of the objective lens 15. As can be seen from FIG. 2 as well, the light field image imaged on the imaging area (main imaging surface) of the image pickup element 16 is imaged as the phase difference images on the imaging area (intended imaging surface) of the image pickup element 21 by the separator lenses 20A and 20B.

With regard to control systems in the microscope 1, a stage driving control portion 31, an illumination control portion 32, an image capturing control portion 33, and a phase difference image capturing control portion 34 are connected to the stage driving mechanism 12, the light source 13, the image pickup element 16, and the image pickup element 21, respectively, through a communication path.

These control systems are configured in the form of a computer including a Central Processing Unit (CPU), a Read Only Memory (ROM), a Random Access Memory (RAM) becoming a work memory of the CPU, an arithmetically operating circuit, and the like.

The stage driving control portion 31 moves (scans) the stage 11 in a stage surface direction (in the X-axis-Y-axis direction) so as to allocate the tissue slice TS of the preparation PRT to a condensed light portion condensed by the condenser lens 14 by controlling the drive of the stage driving mechanism 12.

In addition, the stage driving control portion 31 moves the stage 11 in the direction orthogonal to the stage surface (in the Z-axis direction (that is, in a depth direction of the tissue slice TS)) so as for a portion of the tissue slice TS allocated to the condensed light portion to meet a focal point of the objective lens 15 by controlling the drive of the stage driving mechanism 12.

The illumination control portion 32 sets a parameter corresponding either to a mode in which the light field image is to be acquired (hereinafter referred to as "a light field mode" as well) or to a mode in which the dark field image is to be acquired (hereinafter referred to as "a dark field mode" as well) in the light source 13, and causes the light source 13 to radiate the illumination light. The parameter, for example, is used for selection or the like of an intensity of the illumination light, or a kind of light source.

It is noted that the illumination light in the light field mode is generally a visible light. On the other hand, the illumination light in the dark field mode is a light containing therein a wavelength with which a fluorescent marker used in the special staining is excited. In addition, in the dark field mode, a background portion for the fluorescent marker is cut out.

When the illumination light is radiated from the light source 13, that illumination light is condensed on a reference position of the preparation placement surface in the stage 11 by the condenser lens 14. An image of a portion, of the tissue slice TS in the preparation PRT, on which the light is condensed by the condenser lens 14 is enlarged and imaged on the imaging surface of the objective lens 15, and the resulting enlarged image is imaged as a subject image on the imaging area of the image pickup element 16 by the objective lens 15. In addition, the light corresponding to the subject image and reflected by the half mirror 17 is imaged as the phase difference images on the imaging area (intended imaging surface) of the image pickup element 21 by the separator lenses 20A and 20B.

The image capturing control portion 33 sets parameters corresponding either to the light field mode or to the dark field mode in the image pickup element 16, and acquires data on the subject image imaged on the imaging area of the image pickup element 16. The parameters, for example, are a start timing, an end timing of exposure, and the like.

The phase difference image capturing control portion 34 sets parameters corresponding either to the light field mode or to the dark field mode in the image pickup element 21, and acquires data on the phase difference images imaged on the imaging area of the image pickup element 21. The parameters, for example, are a start timing, an end timing of exposure, and the like.

Now, the microscope 1 is provided with a control portion (hereinafter referred to as "a general control portion") 30 for the entire control of the microscope 1. The control portion 30 is connected to the stage driving control portion 31, the illumination control portion 32, the image capturing control portion 33, and the phase difference image control portion 34 through the data communication path. The general control portion 30 is configured in the form of a computer including a CPU, a ROM, a RAM, an arithmetically operating circuit, a Hard Disc Drive (HDD), and the like.

The general control portion 30 waits for an instruction in accordance with which either the light field mode or the dark field mode is started. When the general control portion 30 retrieves the start instruction, the general control portion 30 issues a command in accordance with which the control is to be started with a mode corresponding to the start instruction to each of the stage driving control portion 31, the illumination control portion 32, the image capturing control portion 33, and the phase difference image control portion 34.

Whenever a portion of the tissue slice TS of the preparation PRT is allocated in the stage driving control portion 31, the general control portion 30 causes the image pickup element 21 to capture an image of the portion of the tissue slice TS, thereby acquiring data on the phase difference images of the portion of the tissue slice TS.

Here, the openings 19A and 19B of the microscope 1 are set in the microscope 30 in such a way that the subject depth of each of the separator lenses 20A and 20B is sufficiently deeper than a thickness of the tissue slice TS fixed to the preparation PRT. Therefore, the general control portion 30 acquires the phase difference images in a state in which the light corresponding to the phase difference images focuses in the entire thickness direction in the portion of the tissue slice TS.

The general control portion 30 subjects the phase difference images thus acquired to arithmetically operating processing which will be described later, and calculates a parallax (shift amount) of the other image (hereinafter referred to as "a comparative image" as well) of the phase difference images with respect to the pixels for one image (hereinafter referred to as "a reference image" as well), to be made the reference, of the phase difference images.

The general control portion 30 determines a position on which the focal point of the object lens 15 is to be focused (hereinafter referred to as "a focusing position" as well) in accordance with the parallax (shift amount) thus calculated.

With the general control portion 30, a movement amount of focal point of the objective lens 15 with respect to the focusing position is calculated and the stage 11 is moved by the stage driving control portion 31. Also, the data on the enlarged image in the portion of the tissue slice TS acquired by using the image pickup element 16 is stored in a storage media.

Also, the general control portion 30 waits for a display instruction. When the general control portion 30 receives the display instruction, the general control portion 30 reads out the data corresponding to the enlarged image specified by the display instruction from the storage media, and sends the data thus read out to a sending destination.

As described above, the microscope 1 stores the image of the tissue slice TS of the preparation PRT as image data in the microscopical visualization state, whereby the information on the tissue slice TS can be preserved for the long term without deteriorating the state of the fixing, staining and the like.

[1-2. Arithmetically Operating Processing]

In the general control portion 30, a program (hereinafter referred to as "an arithmetically operating program" as well) for calculating the correlations and the parallaxes of a comparative image CG with respect to the pixels for the reference image SG in the phase difference images is stored in the HDD.

Figure 3:
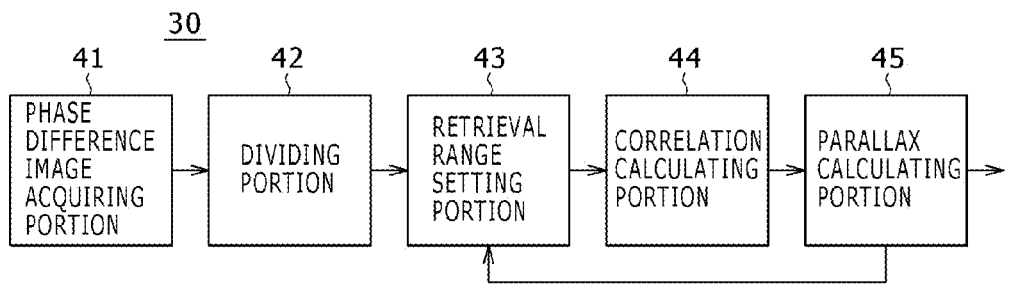
FIG. 3 is a schematic diagram showing a functional configuration of a general control portion shown in FIG. 1.

The general control portion 30 reads out the arithmetically operating program from the HDD and develops the arithmetically operating program thus read in the RAM, thereby executing the arithmetical operation processing. At this time, the general control portion 30 functions as a phase difference image acquiring portion 41, a dividing portion 42, a retrieval range setting portion 43, a correlation calculating portion 44, and a parallax calculating portion 45 as shown in FIG. 3 in accordance with the arithmetically operating program.

The phase difference image acquiring portion 41 acquires data on the phase difference images captured by using the image pickup element 21 through the phase difference image capturing control portion 34.

Figure 4A:
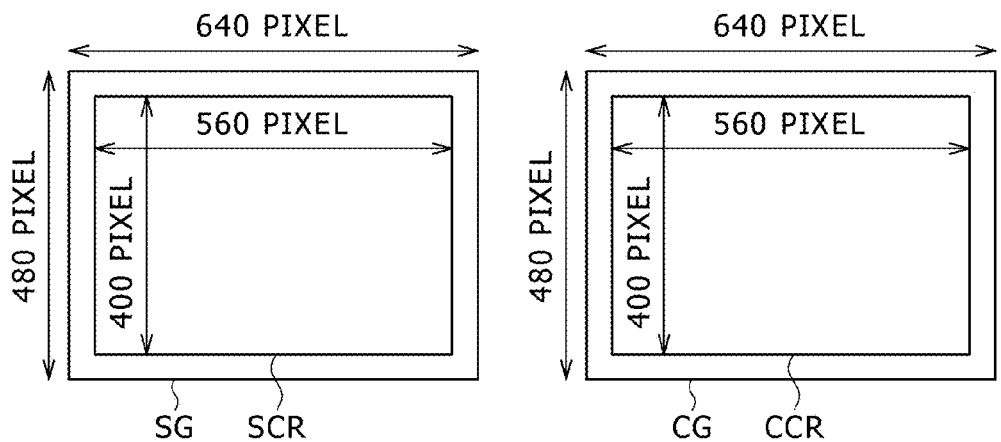
FIGS. 4A and 4B are respectively schematic diagrams for explanation for setting of a retrieval range for representative points.
Figure 4B:
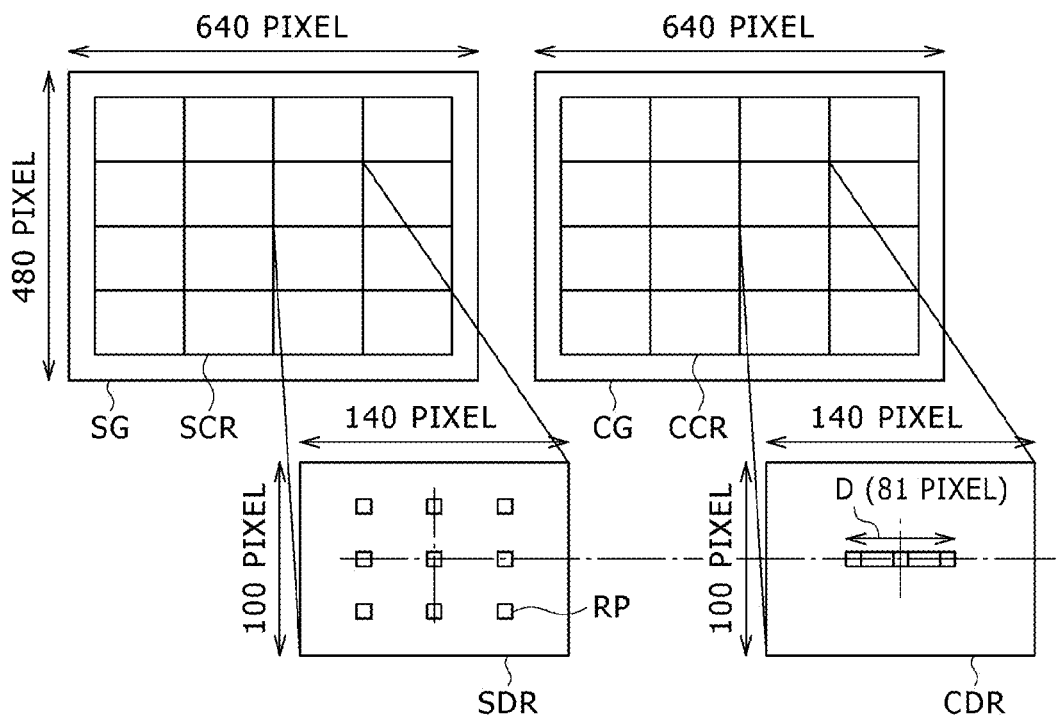

As shown in FIG. 4A, when each of the reference image SG and the comparative image CG in the phase difference images, for example, has a region of 640×480 pixels, the dividing portion 42, for example, sets regions SCR and CCR (hereinafter each referred to as "a correlation calculation region" as well) each having 560×400 pixels with the centers of the respective images as the references. By the way, the correlation calculation regions SCR and CCR are set in ranges which are narrower than the reference image SG and the comparative image CG, respectively, so that the correlations between the pixels for the reference image SG, and the pixels in a predetermined range of the comparative image CG can be calculated.

The diving portion 42 divides the correlation region SCR of the reference image SG, and the correlation calculating region CCR of the comparative image CG into 16 regions SDR and 16 regions CDR (hereinafter each referred to as "a division region" as well), for example, each having 140×100 pixels.

The retrieval region setting portion 43, for example, extracts nine pixels in the division region SDR of the reference image SG as representative pixels RP. For example, a central pixel in the division region SDR, and the pixels corresponding to apexes, and middle points of four sides in a rectangle having a predetermined size with the central pixel as a center are selected as the representative points RP. Here, setting a plurality of representative points RP results in that it is possible to prevent a retrieval error caused by setting the representative points RP either in a region in which there is nothing in a region in which the retrieval is difficult to carry out (such as a fat cell) in the tissue slice TS.

The retrieval range setting portion 43, for example, sets a range (hereinafter referred to as "a retrieval range" as well) D of the pixels in which the correlations with representative points RP are calculated in the comparative image CG as being ±40 pixels with the pixels (hereinafter referred to as "comparative pixels" as well) of the comparative image CG located in the positions corresponding to the representative points RP as the center.

Here, the tissue slice TS fixed to the preparation PRT has a roll having a size of about 100 μm in some cases. Therefore, when the parallax, for example, is detected in the range of 5 μm/pixel, each of the correlations is calculated in the range of ±40 pixels, that is, in the range of ±200 μm. Thus, the pixels having the highest correlations with the representative points RP, respectively, can be reliably detected within the retrieval range D.

The correlation calculating portion 44 calculates correlation values between the representative points RP in the division range SDR, and the pixels in the retrieval range D.

Here, the representative point RP has nine pixels in each of the division regions SDR, the retrieval range D has 81 pixels in the range of ±40 pixels with the comparative pixels as the centers, and the number of division regions SDR is 16. Therefore, for the purpose of calculating the correlations between the representative points RP and the pixels in the retrieval range D, the correlation calculating portion 44 carries out 11,664 (=9×81×16) correlation arithmetic operations.

The parallax calculating portion 45 detects the pixel having the largest correlation value with the representative point RP within the retrieval range D with respect to each of the representative points RP, that is, the pixel having the highest correlation therewith, and calculates a distance (shift amount) from the comparative pixel to the pixel thus detected as the parallax.

The retrieval range setting portion 43 sets the retrieval range for the pixels other than the representative points RP in the division region SDR every division region SDR in accordance with the parallaxes of the representative points RP in the division regions SDR concerned.

Figure 5:
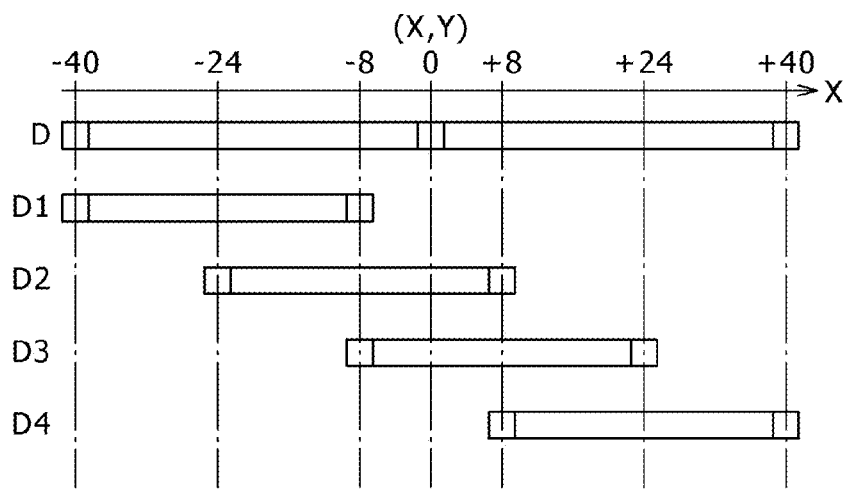
FIG. 5 is a schematic diagram for explanation for setting of a retrieval range for pixels other than pixels for the representative points.

Specifically, as shown in FIG. 5, the retrieval range setting portion 43 sets the retrieval ranges D1 to D4 each of which falls within the retrieval range D of ±40 pixels set for each of the representative points RP, and is narrower than the retrieval range D (this range is 33 pixels in this case).

For example, the retrieval range D1 is set in the range of (X−40,Y) to (X−8,Y) with the comparative pixel (X,Y) as the reference. The retrieval range D2 is set in the range of (X−24, Y) to (X+8, Y) with the comparative pixel (X, Y) as the reference. Also, the retrieval range D3 is set in the range of (X−8,Y) to (X+24,Y), and the retrieval range D4 is set in the range of (X+8,Y) to (X+40,Y).

Here, if the parallax is detected as 5 µm/pixel, each of the retrieval ranges D1 to D4 for the pixels other than the representative points RP is set as 33 pixels, whereby the correlation and the parallax are each calculated in the range of ±60 µm with each of the retrieval ranges D1 to D4 as the reference. Since the actual tissue slice TS, for example, has an undulation having a size of about ±20 µm within an angle field of about 3 mm, when the correlation and the parallax are each calculated so as to fall within the range of ±60 µm, the setting is carried out so as to meet the sufficient retrieval range.

Figure 6:
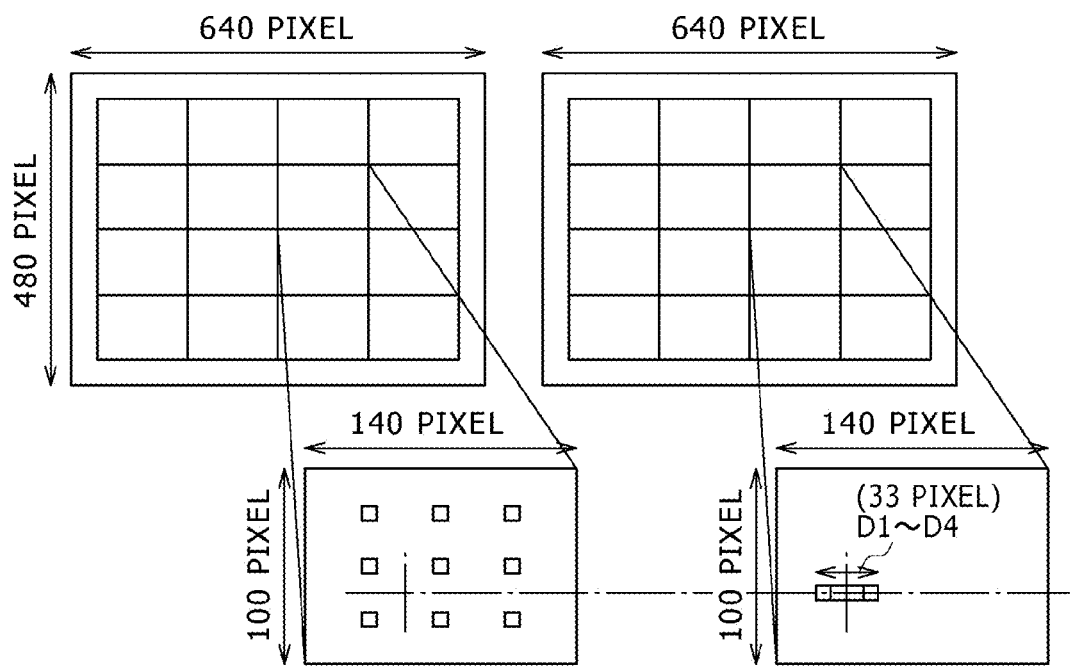
FIG. 6 is a schematic diagram showing a correlation distribution corresponding to thicknesses of the tissue slice.

As shown in FIG. 6, the retrieval range setting portion 43, for example, compares an average value of the parallaxes of nine representative points RP, and each of the central positions of the retrieval ranges D1 to D4 with each other in accordance with the parallaxes of nine representative points RP in each of the division regions SDR. As a result, the retrieval range setting portion 43 sets any one of the retrieval ranges D1 to D4, having the central position which is closest to the average value as the retrieval range for the division region SDR.

The correlation calculating portion 44 calculates the correlation values between the pixels other than the representative points RP in each of the division regions SDR, and the pixels in any one of the retrieval ranges D1 to D4 thus set.

Here, the pixels other than the representative points RP in the division region SDR are (140×100−9) pixels, each of the retrieval ranges D1 to D4 has 33 pixels, and the number of division regions SDR is 16. Therefore, the correlation calculating portion 44 carried out 7,387,248 (=(140×100−9)×33× 16) correlation arithmetic operations for the purpose of calculating the correlations between the pixels other than the representative points RP, and the pixels in any one of the retrieval ranges D1 to D4.

The parallax calculating portion 45 detects the pixel having the highest correlation with the pixels other than the representative points RP within any one of the retrieval ranges D1 to D4 with respect to the pixels other than the representative points RP, and calculates distances (shift amounts) from the comparative pixel to the pixels detected as the parallaxes.

There is obtained a relationship in which the tissue slice TS is located on the objective lens 15 side (forward) as the parallax is larger, whereas the tissue slice TS is located backward as the parallax is smaller. Therefore, the parallax for each of the pixels for the reference image SG corresponds to information representing an irregular state of the image capturing range (the region reflected on the imaging surface of the objective lens 15) of the tissue slice TS in the preparation PRT.

As described above, the general control portion 30 divides each of the correlation calculation region SCR of the reference image SG, and the correlation calculation region CCR of the comparative image CG into 16 division regions SDR, and sets the retrieval ranges D in nine representative points RP of 16 division regions, respectively, thereby calculating both the correlations and the parallaxes. Also, the general control portion 30 sets any one of the retrieval regions D1 to D4 for each of the pixels other than the representative points RP in each of the division regions SDR in accordance with the parallaxes of the representative points RP concerned, thereby calculating both the correlations and the parallaxes.

Therefore, the correlation calculating portion 44 carries out 11,664 correlation arithmetic operations for the purpose of calculating the correlations of the representative points RP, and carries out 7,387,248 correlation arithmetic operations for the purpose of calculating the correlations of the pixels other than the representative points RP. Therefore, the correlation calculating portion 44 carries out 7,398,912 (=11,664+ 7,387,248) correlation arithmetic operations in total.

[1-3. Procedure of Arithmetically Operating Processing]

Figure 7:
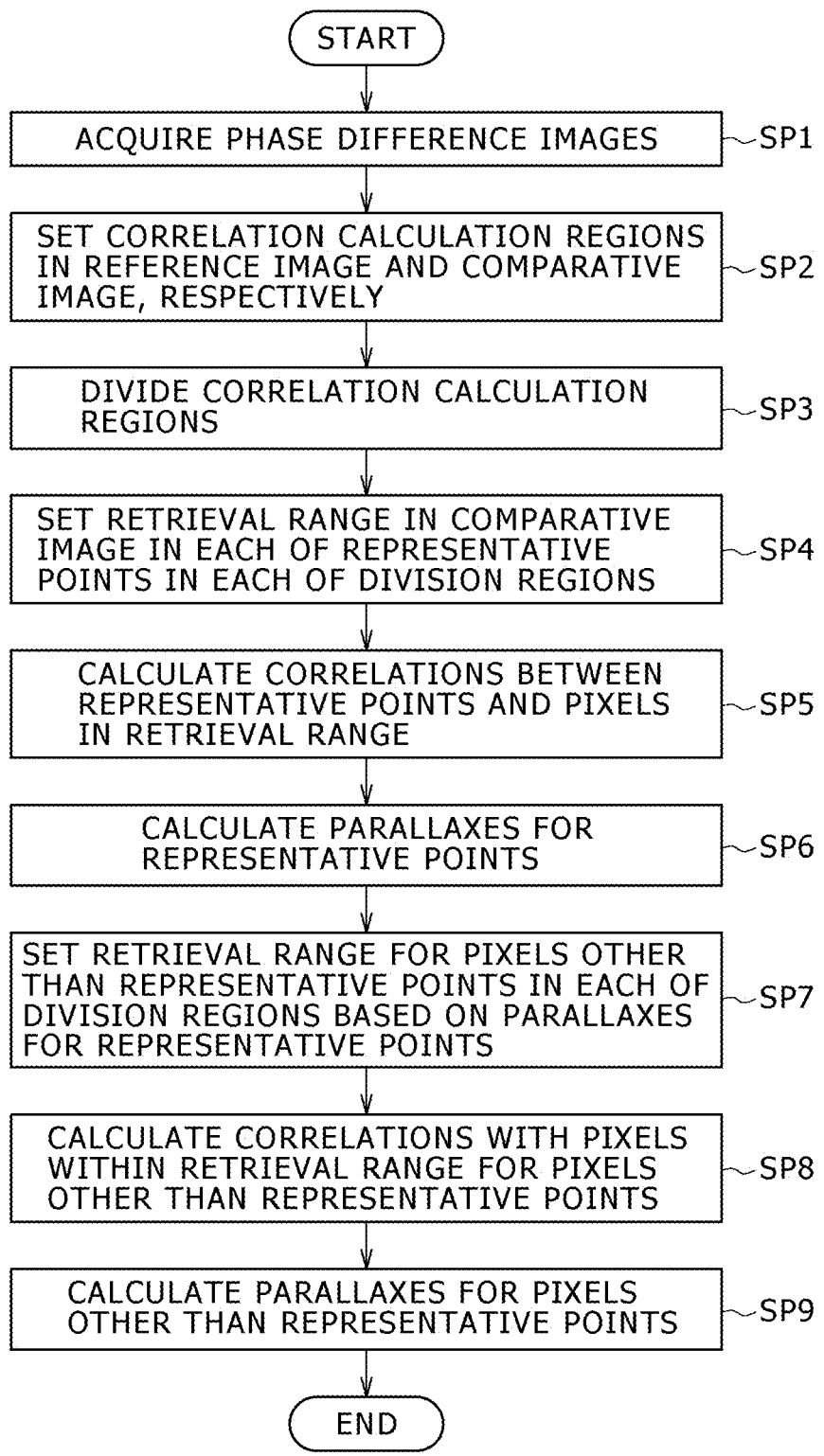
FIG. 7 is a flow chart showing a procedure of arithmetically operating processing.

Next, a procedure of the arithmetically operating processing described above will be described with reference to a flow chart shown in FIG. 7.

Actually, an operation of the general control portion 30 enters start Step and proceeds to processing in next Step SP1. In Step SP1, the general control portion 30 acquires the phase difference images captured by using the image pickup element 21 through the phase difference image capturing control portion 34, and the operation of the general control portion 30 proceeds to processing in next Step SP2.

In Step S2, the general control portion 30 sets correlation calculation regions SCR and CCR as regions in which the correlations can be calculated for the reference image SG and the comparative image CG of the phase difference images, and the operation of the general control portion 30 proceeds to processing in next Step SP3.

In Step SP3, the general control portion 30, for example, divides the correlation calculation regions SCR set in the reference image SG, and the correlation calculation region CCR set in the comparative image CG into 16 division regions SDR and 16 division regions CCR, respectively, and the operation of the general control portion 30 proceeds to processing in next Step SP4.

In Step SP4, the general control portion 30, for example, extracts nine pixels in the division region SDR of the reference image SG as the representative points RP, and sets the retrieval range D with the comparative pixel as the center in each of the representative points RP, and the operation of the general control portion 30 proceeds to the processing in next Step SP5.

In Step SP5, the general control portion 30 calculates the correlations between the representative points RP and the pixels of the retrieval range D. Also, in next Step SP6, the general control portion 30 calculates distances (shift amounts) from the comparative pixels to the pixels each having the highest correlation as the parallaxes, and the operation of the general control portion 30 proceeds to processing in next Step SP7.

In Step SP7, the general control portion 30 sets any one, of the retrieval regions D1 to D4, which is narrower than the retrieval range D for each of the pixels other than the representative points RP in each of the division regions SD in accordance with the parallaxes of the representative points RP, and the operation of the general control portion 30 proceeds to next Step SP8.

In Step SP8, the general control portion 30 calculates the correlations between the pixels other than the representative points RP, and the pixels in any one of the retrieval ranges D1 to D4 thus set. Also, in next Step SP9, the general control portion 30 calculates distances from the comparative pixels to the pixels each having the highest correlation as the parallaxes, and the operation of the general control portion 30 ends.

[1-4. Operation and Effects]

With the configuration described above, the general control portion 30 acquires the phase difference images captured by the image pickup element 21, and divides each of the reference image SG and the comparative image CG in the phase difference images into a plurality of division regions.

Also, the general control portion 30 sets the retrieval range D having a predetermined number of pixels for calculation in the comparative image CG in each of the representative points RP of the division region SDR, thereby calculating both the correlations and the parallaxes.

The general control portion 30 sets the retrieval ranges D1 to D4 each narrower than the retrieval range D set in each of the representative points RP in the pixels other than the representative points RP in each of the division regions SDR every division region SDR in accordance with the parallaxes of the representative points RP, thereby calculating both the correlations and the parallaxes.

As a result, the general control portion 30 detects a rough position of the tissue slice TS corresponding to the division region SDR by calculating the parallaxes of the representative points RP. Also, the general control portion 30 sets the retrieval ranges D1 to D4 for the pixels other than the representative points RP in each of the division regions SDR in accordance with the rough position thus detected.

Therefore, even when the general control portion 30 sets the retrieval ranges D1 to D4 for the pixels other than the representative points RP in each of the division regions SDR as ranges each narrower than the retrieval range D for the representative point RP, the pixels having the highest correlations with the pixels other than the representative points RP can be detected within the retrieval regions D1 to D4.

Now, when the retrieval range D of ±40 pixels with the comparative pixels as the centers is set for all the pixels of the correlation calculation region SCR in the reference image SG, the number of pixels is 560×400, and the retrieval range has 81 pixels. Therefore, in this case, 18,144,000 (=560× 400×81) correlations arithmetic operations must be carried out.

On the other hand, the general control portion 30, for example, divides the correlation calculation region SCR into 16 division regions SDR, and sets the retrieval range D of ±40 pixels with the comparative pixels as the centers in each of nine representative points RP of each of 16 division regions SDR. In addition, the general control portion 30 sets the retrieval ranges D1 to D4 each having 33 pixels in the pixels other than the representative points RP of each of the division regions SDR in accordance with the parallaxes of the representative points RP.

Therefore, the general control portion 30 has only to carry out 7,398,912 correlation arithmetic operations. Thus, the number of times of arithmetic operations which is about 40% as compared with the case where the retrieval range D is set for all the pixels has only to be carried out, and thus it is possible to realize the large speeding up of the arithmetic operation processing.

Figure 8:
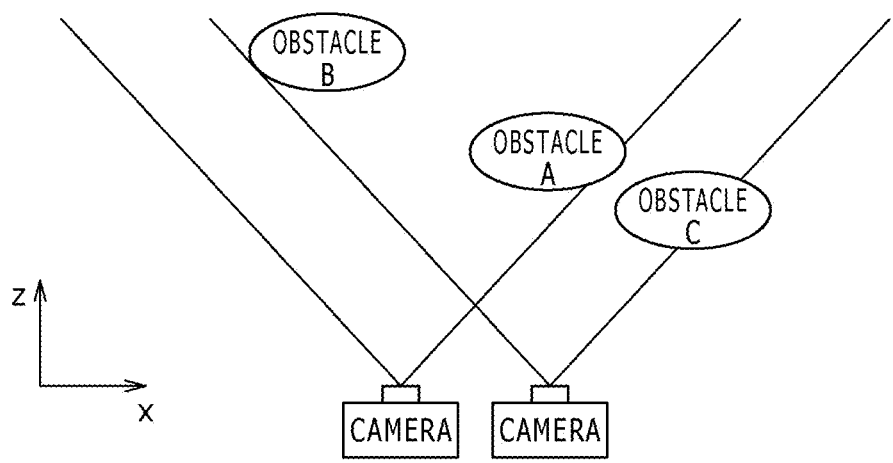
FIG. 8 is a schematic view showing a construction of a general stereo camera.

In addition, with the general stereo camera, as shown in FIG. 8, it is difficult to limit (narrow) the retrieval range for the purpose of calculating the positions of objects (obstacles) which are discontinuously disposed in the depth direction. In addition, after the rough positions of the obstacles are specified through the rough retrieval, the retrieval range is limited, thereby carrying out fine retrievals for the positions of the obstacles. In this method, however, since the rough retrieval and the fine retrieval are different in arithmetic operation precision from each other, the retrieval must be carried out for the entire range again in the fine retrieval.

On the other hand, when the retrieval is aimed at the image of the tissue slice TS having the continuous distribution structure, the image of the tissue slice TS within each of the division ranges SDR is approximately flat in the depth direction. Therefore, the general control portion 30 can set each of the retrieval ranges D1 to D4 in the range narrower than the retrieval range D, and thus this setting is especially useful. In addition, the arithmetic operations of the correlations and the parallaxes for the representative points RP, and the arithmetic operations of the correlations and the parallaxes for the pixels other than the representative points RP are identical in arithmetic operation precision to each other. Therefore, it is possible to speed up the arithmetically operating processing all the more because it is unnecessary to carry out the arithmetic operation in the narrow retrieval ranges D1 to D4 again for the representative point RP.

In addition, the general control portion 30 sets the retrieval ranges D1 to D4 each within the retrieval range D and narrower than the retrieval range D so that parts of the retrieval ranges D1 to D4 overlap one another. As a result, it is possible to prevent that when the general control portion 30 sets the retrieval range for the pixels of each of the division region SDR, even if the general control portion 30 collectively sets the same retrieval range for the pixels of each of the division regions SDR, it may be impossible to detect the pixel having the highest correlation with each of the pixels within the retrieval range.

According to the constitution described above, the correlation calculation region SCR of the reference image SG is divided into the division regions SDR, and the retrieval region D is set in each of the representative points RP of each of the division regions SDR, thereby calculating the correlations and the parallaxes. Also, any one of the retrieval ranges D1 to D4 is set for the pixels other than the representative points RP in each of the division regions SDR in accordance with the parallaxes of the representative points RP, thereby calculating both the correlations and the parallaxes.

It is possible to largely reduce the number of times of the arithmetic operations without reducing the arithmetic operation precision with which both the correlations and the parallaxes of the comparative image CG for the pixels of the reference image SG. Therefore, the irregular information on the tissue slice TS can be calculated at a high speed, and thus it is possible to enhance the efficiency of acquiring the subject image.

2. Changes

In the embodiment described above, the description has been given with respect to the case where each of the correlation calculation regions SCR and CCR is divided into 16 division regions SDR, nine representative points RP is extracted from each of 16 division regions SDR, and any one of the retrieval ranges D1 to D4 is set in the pixels other than nine representative points RP in each of 16 division regions SDR. However, the present invention is by no means limited thereto. That is to say, the number of divisions of each of the correlation calculation regions SCR and CCR, the number of representative points RP in each of the division regions SDR, and the number of retrieval ranges set for the pixels other than the representative points RP in each of the division regions SDR can be arbitrarily set.

However, the number of divisions is increased and the number of retrieval ranges is increased to narrow one retrieval range, thereby making it possible to further speed up the arithmetically operating processing. It is noted that the number of divisions of each of the phase difference calculation regions SCR and CCR is increased, whereby the roll (shift in the depth direction) in the image of the tissue slice TS in one division region SDR becomes small. Thus, even when the retrieval range is further narrowed, the pixels having the highest correlations with the pixels of the reference image SG can be reliably detected.

As an example, each of the phase difference calculation regions SCR and CCR each having (560×400) pixels is divided into 64 (=8×8) division regions SDR, and 16 representative points RP are set in each of the division regions SDR. In addition, the retrieval range D for each of the representative points RP is set as being ±40 pixels with the comparative pixels as the centers, the number of retrieval ranges for the pixels other than the representative points RP is set as 16, and one retrieval range is set so as to have 11 pixels.

In this case, for the purpose of calculating the correlations with the representative points RP, the correlation calculating portion 44 carries out 82,944 (=16×81×64) correlation arithmetic operations. In addition, for the purpose of calculating the correlations with the pixels other than the representative points RP, the correlation calculating portion 44 carries out 2,452,736 {(=560/8×400/8−16)×11×64)} correlation arithmetic operations.

Therefore, the correlation calculating portion 44 carries out 2,452,736 (=82,944+2,452,736) correlation arithmetic operations in total. As a result, the number of times of arithmetic operations which is about 14% as compared with the case where the retrieval range D is set for all the pixels has only to be carried out, and it is possible to realize the further speeding up of the arithmetically operating processing.

In the embodiment described above, after each of the correlation calculating regions SCR and CCR is divided into the division regions SDR, both the correlations and the parallaxes of the representative points RP of each of the division regions SDR are calculated, and the retrieval regions D1 to D4 are set for the pixels other than the representative points RP in accordance with the parallaxes of the representative points RP, thereby calculating both the correlations and the parallaxes. However, the present invention is by no means limited thereto.

Figure 9A:
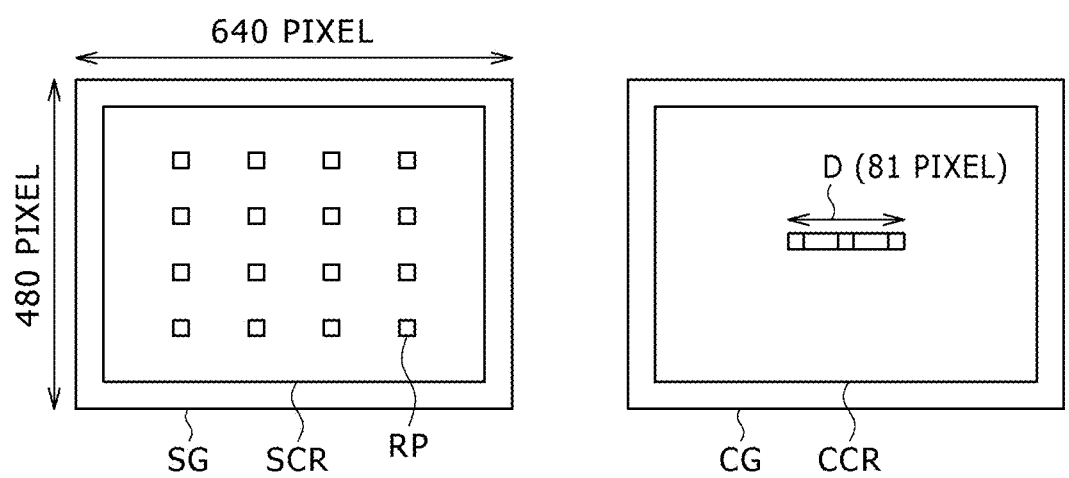
FIGS. 9A and 9B are schematic diagrams for explanation for division in a change of the embodiment.

For example, as shown in FIG. 9A, the correlation calculating portion 44 and the parallax calculating portion 45 set a predetermined number (16 in this case) of representative points RP in the correlation calculation region SCR in the reference image SG. Also, the correlation calculating portion 44 and the parallax calculating portion 45 calculates the correlations and the parallaxes between the representative points RP and the pixels of the retrieval range D in the comparative image CG.

Figure 9B:
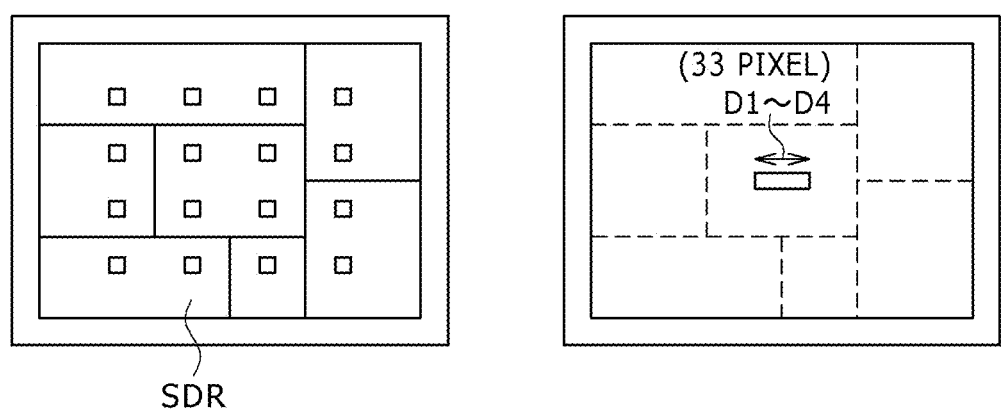

Also, as shown in FIG. 9B, for example, when a difference in parallax between adjacent two representative points RP falls within a predetermined threshold value, the dividing portion 42 divides the correlation calculation region SCR into division regions SDR in such a way that such adjacent representative points RP are contained in the same division region SDR in accordance with the parallaxes of the representative points RP thus calculated. On the other hand, when a difference in parallax between adjacent two representative points RP is larger than the predetermined threshold value, the dividing portion 42 divides the correlation calculation region SCR into division regions SDR in such a way that such adjacent representative points RP are contained in the different division regions SDR, respectively.

The retrieval range setting portion 43, for example, sets the retrieval range for the pixels other than the representative points RP in each of the division regions SDR in any one of four retrieval ranges D1 to D4 in accordance with the parallaxes of the representative points RP existing within each of the division regions SDR.

The correlation calculating portion 44 and the parallax calculating portion 45 calculates both the correlations and the parallaxes of the pixels other than the representative points RP in each of the division regions SDR.

A process may also be adopted such that after the correlations and the parallaxes for the representative points RP which are set in the correlation calculation region SCR are calculated in the manner as described above, the correlation calculation region SCR is divided into the division regions SDR in accordance with the parallaxes thus calculated, and the retrieval ranges D1 to D4 for the pixels other than the representative points RP in each of the division regions SDR are set, thereby calculating both the correlations and the parallaxes.

In the embodiment described above, the description has been given with respect to the case where the retrieval ranges D1 to D4 each having a fixed number of pixels, i.e., 33 pixels are set as the retrieval ranges for the pixels other than the representative points RP in each of the division regions SDR. However, the present invention is by no means limited thereto. That is to say, the retrieval ranges each having a variable number of pixels may also be set as the retrieval ranges for the pixels other than the representative points RP in each of the division regions SDR.

In this case, for example, when a difference in parallax between a plurality of representative points RP is small, the number of pixels in the retrieval range is set small in accordance with the parallaxes of a plurality of representative points RP in each of the division regions SDR. On the other hand, when a difference in parallax between a plurality of representative points RP is large, the number of pixels in the retrieval range is largely set in accordance with the parallaxes of a plurality of representative points RP in each of the division regions SDR. As a result, the number of times of arithmetic operations can be further reduced as compared with the case where the arithmetic operations are carried out by using the retrieval ranges D1 to D4 each having a fixed number of pixels.

In the embodiment described above, the description has been given with respect to the case where the retrieval ranges for the pixels other than the representative points RP are set by using all the parallaxes of a plurality of representative points RP in each of the division regions SDR. However, the present invention is by no means limited thereto. That is to say, the parallaxes, of the representative points RP, the value of which are remarkably different from one another, of the parallaxes of a plurality of representative points RP may be excluded, and in this state, the retrieval ranges for the pixels other than the representative points RP may be set.

In the embodiment described above, the description has been given with respect to the case where the average value of the parallaxes of nine representative points RP, and the central positions of the retrieval ranges D1 to D4 are compared with each other, and any one, of the retrieval ranges D1 to D4, having the central position closest to the average value is set as the retrieval range for the division region SDR. However, the present invention is by no means limited thereto. For example, any one, of the retrieval ranges D1 to D4, in which all the positions represented by the parallaxes of nine representative points RP fall may be set as the retrieval range for the division region SDR.

In the embodiment described above, the tissue slice TS is used as the sample. However, the sample is by no means limited thereto. For example, a cell, a chromosome or the like may also be applied as a sample (biological sample) about a living object to the present invention.

In the embodiment described above, the two sheets of separator lenses 20A and 20B are used. However, the number of separator lenses 20 is by no means limited to that in the embodiment. That is to say, multiple sheets of separator lenses 20 can be used with a pair of separator lenses 20A and 20B as a unit (set). It is noted that in this case, openings corresponding to the sets of separator lenses 20 need to be provided in the step mask 19.

In the embodiment described above, the description has been given with respect to the case where one objective lens 15 having the predetermined magnification is provided. However, the present invention is by no means limited thereto. That is to say, a plurality of objective lenses having different magnifications, respectively, may be provided, and any suitable one may be selected from a plurality of objective lenses either by a lens switching mechanism or by a manual operation.

In the embodiment described above, the description has been given with respect to the case where the light made incident from the objective lens 15 is divided into the transmitted light and the reflected light by the half mirror 17, and the transmitted light and the reflected light are guided to the image pickup elements 16 and 21, respectively. However, the present invention is by no means limited thereto. That is to say, a mirror and a mirror lockup mechanism may be provided instead of providing the half mirror 17.

In this case, when the phase difference images are imaged on the image pickup element 21, the mirror is disposed on an optical path between the objective lens 15 and the image pickup element 16, and a reflected light from the mirror is guided to the image pickup element 21. On the other hand, when a subject image is imaged on the image pickup element 16, the mirror is removed from the optical path between the objective lens 15 and the image pickup element 16 by the mirror lockup mechanism, thereby guiding the light from the objective lens 15 to the image pickup element 16.

In the embodiment described above, the description has been given with respect to the case where the data on the phase difference images captured by the image pickup element 21 is acquired. However, the present invention is by no means limited thereto. That is to say, the data on the phase difference images, for example, may be acquired through the Internet, or may be acquired through a predetermined storage media.

In addition, in the embodiment described above, the description has been given with respect to the case where the general control portion 30 executes the arithmetically operating processing described above in accordance with the arithmetically operating program stored in the HDD. However, the present invention is by no means limited thereto. That is to say, a thickness information acquiring processing may be stored in the ROM. Also, the arithmetically operating processing described above may also be executed in accordance with an arithmetically operating program which is installed from a storage media or down loaded from the Internet. In addition, the general control portion 30 executes the arithmetically operating processing described above in accordance with an arithmetically operating program installed through any other suitable one of various kinds of routes.

Moreover, in the embodiment described above, the description has been given with respect to the case where the phase difference image acquiring portion 41 is provided as the image acquiring portion, the retrieval range setting portion 43 is provided as the retrieval range setting portion, the correlation calculating portion 44 is provided as the correlation calculating portion, and the parallax calculating portion 45 is provided as the parallax calculating portion. However, the present invention is by no means limited thereto. That is to say, the image acquiring portion, the retrieval range setting portion, the correlation calculating portion, and the parallax calculating portion having various kinds of configurations, respectively, may also be provided.

The present embodiments can be utilized in the biotechnology-based industry such as biological experiments, origination of medical drags or follow-up of a patient.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An arithmetically operating device comprising:
an image acquiring portion configured to acquire reference and comparative phase difference images of a sample;
a dividing portion configured to divide the reference phase difference image and the comparative phase difference image into a plurality of corresponding division regions;
a retrieval range setting portion configured to designate a two dimensional array of pixels in a given division region of the reference phase difference image as representative pixels, and to designate a one dimensional array of pixels other than the representative pixels in a corresponding division region of the comparative phase difference image as comparative pixels;
a correlation calculating portion configured to calculate correlations between the representative pixels for the reference phase difference image, and the comparative pixels in the comparative phase difference image; and
a parallax calculating portion configured to calculate parallaxes for the representative pixels for the reference phase difference image in accordance with the correlations thus calculated;
wherein the dividing portion sets the shapes and sizes of the division regions based on difference comparisons between the determined parallaxes of adjacent representative pixels such that if a difference in parallaxes between adjacent representative pixels exceeds a threshold value said adjacent representative pixels may not be included in the same division region, whereas if the difference in parallaxes between adjacent representative pixels is less than the threshold value said adjacent representative pixels may be included in the same division region, and wherein said retrieval range setting portion also sets a sub-comparative pixel array for the comparative phase difference image that is narrower than that set for the comparative pixels in accordance with the parallaxes calculated for the representative pixels in each of the division regions.

2. The arithmetically operating device according to claim 1, wherein said retrieval range setting portion sets a range for the comparative pixels in each of the division regions from a plurality of regions each falling within the range set for the representative pixels and each narrower than the range set for the representative pixels.

3. The arithmetically operating device according to claim 2, wherein the plurality of ranges are set so as for parts of the plurality of ranges to overlap each other.

4. The arithmetically operating device according to claim 1, wherein said retrieval range setting portion sets a range having a size based on the parallaxes calculated for the representative pixels in each of the division regions for the comparative pixels in each of the division regions.

5. The arithmetically operating device according to claim 1, wherein said sample is a tissue slice.

6. An arithmetically operating method comprising:
acquiring reference and comparative phase difference images of a sample;
dividing the reference phase difference image and the comparative phase difference image into a plurality of corresponding division regions;
designating a two dimensional array of pixels in a given division region of the reference phase difference image as representative pixels, and designating a one dimensional array of pixels other than the representative pixels in a corresponding division region of the comparative phase difference image as comparative pixels;
calculating correlations between the representative pixels for the reference phase difference image, and the comparative pixels in the comparative phase difference image; and
calculating parallaxes for the representative pixels for the reference phase difference image in accordance with the correlations thus calculated;
wherein the dividing step includes setting the shapes and sizes of the division regions based on difference comparisons between the determined parallaxes of adjacent representative pixels such that if a difference in parallaxes between adjacent representative pixels exceeds a threshold value said adjacent representative pixels may not be included in the same division region, whereas if the difference in parallaxes between adjacent representative pixels is less than the threshold value said adjacent representative pixels may be included in the same division region, and
wherein the retrieval range setting step includes setting a sub-comparative pixel array for the comparative phase difference image that is narrower than that set for the comparative pixels in accordance with the parallaxes calculated for the representative pixels in each of the division regions.

7. An arithmetically operating computer program product including executable instructions stored on a non-transitory computer-readable medium that when executed by a processor perform steps for:
acquiring reference and comparative phase difference images of a sample;
dividing the reference phase difference image and the comparative phase difference image into a plurality of corresponding division regions;
designating a two dimensional array of pixels in a given division region of the reference phase difference image as representative pixels, and designating a one dimensional array of pixels other than the representative pixels in a corresponding division region of the comparative phase difference image as comparative pixels;
calculating correlations between the representative pixels for the reference phase difference image, and the comparative pixels in the comparative phase difference image; and
calculating parallaxes for the representative pixels for the reference phase difference image in accordance with the correlations thus calculated;
wherein the dividing step includes setting the shapes and sizes of the division regions based on difference comparisons between the determined parallaxes of adjacent representative pixels such that if a difference in parallaxes between adjacent representative pixels exceeds a threshold value said adjacent representative pixels may not be included in the same division region, whereas if the difference in parallaxes between adjacent representative pixels is less than the threshold value said adjacent representative pixels may be included in the same division region, and
wherein the retrieval range setting step includes setting a sub-comparative pixel array for the comparative phase difference image that is narrower than that set for the comparative pixels in accordance with the parallaxes calculated for the representative pixels in each of the division regions.

8. A microscope comprising:
a mirror for causing an incident light from an objective lens either to travel in a straight line or to be reflected;
a first image pickup element for capturing a subject image imaged on said objective lens and projected on one of a direct course side or a reflection side of said mirror;
openings provided at a back of the other of the direct course side or the reflection side of said mirror with one pair as a unit, and each having a size becoming a subject depth wider than that of said objective lens;
separator lenses provided at respective backs of said openings for forming phase difference images on a surface on which a subject image is intended to be imaged, the subject image being projected on the other of the direct course side or the reflection side of said mirror;
a second image pickup element provided with the surface on which the subject image is intended to be imaged as an image capturing surface;
an image acquiring portion configured to acquire reference and comparative phase difference images of a sample from said second image pickup element;
a dividing portion configured to divide the reference phase difference image and the comparative phase difference image into a plurality of corresponding division regions;
a retrieval range setting portion configured to designate a two dimensional array of pixels in a given division region of the reference phase difference image as representative pixels, and to designate a one dimensional array of pixels other than the representative pixels in a corresponding division region of the comparative phase difference image as comparative pixels;

a correlation calculating portion configured to calculate correlations between the representative pixels for the reference phase difference image, and the comparative pixels in the comparative phase difference image; and a parallax calculating portion configured to calculate parallaxes for the representative pixels for the reference phase difference image in accordance with the correlations thus calculated;

wherein the dividing portion sets the shapes and sizes of the division regions based on difference comparisons between the determined parallaxes of adjacent representative pixels such that if a difference in parallaxes between adjacent representative pixels exceeds a threshold value said adjacent representative pixels may not be included in the same division region, whereas if the difference in parallaxes between adjacent representative pixels is less than the threshold value said adjacent representative pixels may be included in the same division region, and wherein said retrieval range setting portion also sets a sub-comparative pixel array for the comparative phase difference image that is narrower than that set for the comparative pixels in accordance with the parallaxes calculated for the representative pixels in each of the division regions.

9. An arithmetically operating device comprising:

image acquiring means for acquiring reference and comparative phase difference images of a sample;

a dividing means configured to divide the reference phase difference image and the comparative phase difference image into a plurality of corresponding division regions;

retrieval range setting means for designate a two dimensional array of pixels in a given division region of the reference phase difference image as representative pixels, and to designate a one dimensional array of pixels other than the representative pixels in a corresponding division region of the comparative phase difference image as comparative pixels;

correlation calculating means for calculating correlations between the representative pixels for the reference phase difference image, and the comparative pixels in the comparative phase difference image; and parallax calculating means for calculating parallaxes for the representative pixels for the reference phase difference image in accordance with the correlations thus calculated;

wherein the dividing means sets the shapes and sizes of the division regions based on difference comparisons between the determined parallaxes of adjacent representative pixels such that if a difference in parallaxes between adjacent representative pixels exceeds a threshold value said adjacent representative pixels may not be included in the same division region, whereas if the difference in parallaxes between adjacent representative pixels is less than the threshold value said adjacent representative pixels may be included in the same division region, and wherein said retrieval range setting means also sets a sub-comparative pixel array for the comparative phase difference image that is narrower than that set for the comparative pixels in accordance with the parallaxes calculated for the representative pixels in each of the division regions.

* * * * *